Feb. 8, 1966
J. B. McCORMICK
3,233,965
STERILIZATION MEANS FOR A REFRIGERATED
CHAMBER CONTAINING A MICROTOME
Filed Oct. 25, 1962
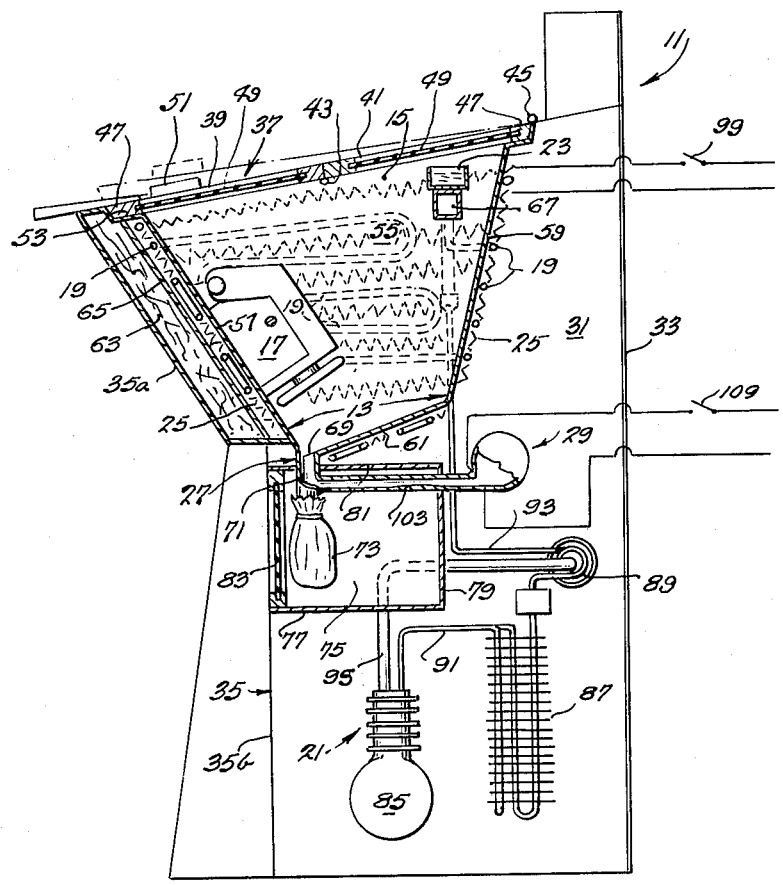
Inventor
JAMES B McCORMICK
By
Soans, Anderson, Luedeka & Fitch
Attys United States Patent Office 3,233,965
Patented Feb. 8, 1966

3,233,965
STERILIZATION MEANS FOR A REFRIGERATED CHAMBER CONTAINING A MICROTOME
James B. McCormick, La Grange, Ill., assignor, by mesne assignments, to Ames Lab-Tek, Inc., a corporation of Massachusetts
Filed Oct. 25, 1962, Ser. No. 233,038
2 Claims. (Cl. 21—85)

This invention relates to apparatus utilized in the removal of thin sections of tissue or the like for use in microscopic examination and, in particular, to apparatus adapted to provide a cold environment in which the slicing of sections from a frozen specimen can best be accomplished.

The sectioning of frozen specimens, particularly the sectioning of frozen animal tissue specimens, is preferably accomplished in a cold or refrigerated atmosphere to insure that both the specimen and the section which is sliced from the specimen will be maintained in a frozen condition. An apparatus which provides such an atmosphere might include a walled chamber within which a microtome instrument is supported, the wall of the chamber being provided with refrigeration coils to effect cooling of the walls and, hence, cooling of the atmosphere within the chamber.

In hospital or research laboratories and the like, it is frequently necessary to utilize refrigerated apparatus of this type for the sectioning of a frozen tissue specimen which is diseased and which thus contains infectious microorganisms. Such a specimen might be, for example, a portion of tubercular lung tissue. After the sectioning of such a specimen has been accomplished, the instruments utilized, including the microtome and the walls of the refrigerated chamber, are contaminated and are therefore not only unsuitable for further use, but also present a hazard for the laboratory technician. Hence, once the microtome and chamber have been thus contaminated, it is desirable to sterilize them in as rapid and efficient manner as posisble.

One method of decontamination frequently utilized in laboratories is exposure to a quantity of steam. However, this method is unsatisfactory for the sterilization of refrigerated sectioning apparatus because of the tendency of the stream to condense on the working elements of the microtome and subsequently become frozen so as to hinder the operation of the instrument.

The principal object of the invention is the provision of an improved method for sterilizing a container having microorganisms therein.

Another object of the present invention is to provide an improved apparatus for the sectioning of a frozen specimen.

A further object of the invention is to provide an improved method of sterilizing a refrigerated chamber in which the sectioning of a frozen specimen is accomplished.

A still further object of the invention is the provision of a refrigerated chamber in which the sectioning of frozen specimens can be accomplished, which chamber includes means for effecting decontamination thereof through the use of a chemical vapor.

Other objects and advantages of the invention will become apparent with reference to the following description and the accompanying drawing.

In the drawing, the illustrated figure is that of an apparatus showing various of the features of the invention.

Very generally, the present method of decontaminating a container or chamber having undesirable microorganisms therein includes the steps of placing within the contaminated container a chemical that is in a nonvaporous physical state, the chemical having such properties in a vaporous state as will enable it to destroy the undesirable microorganisms upon contact therewith for a predetermined length of time. The walls of the container are heated so as to raise the temperature of the atmosphere within the container to above the temperature of vaporization of the chemical, thereby vaporizing the chemical and permitting it to be diffused throughout the container.

The chemical may be placed in the container either before or after the temperature within the container has reached the vaporization temperature of the chemical. In any event, it is introduced as a liquid or solid, not as a vapor, and is vaporized only after disposition within the container. The chemical vapor is contained within the chamber or container a sufficient length of time to insure the destruction of all undesirable microorganisms therein.

The illustrated embodiment of the apparatus of the invention comprises a cabinet 11 having walls 13 defining a chamber or well 15 within which a microtome 17 is supported. Refrigeration coils 19 for cooling of the chamber 15 are disposed adjacent the walls 13 of the chamber and are supplied with a refrigerant by refrigeration means 21 housed within the cabinet 11. Means 23 are provided within the chamber for supporting a quantity of the chemical of sterilization, and heating means 25 are disposed adjacent the walls of the chamber to raise the temperature of the walls, and of the atmosphere within the chamber, above the vaporization temperature of the chemical so that the chemical will thereby be vaporized. Means 27 are provided for removing moisture which accumulates in the chamber in the form of frozen condensation and which melts when the chamber walls are heated, and further means 29 are provided for causing air to flow into the chamber so as to exhaust the chemical vapor and dry the microtome and chamber walls.

More specifically, the cabinet 11 is of a generally hollow design and includes a pair of spaced-apart generally parallel side walls 31, a generally vertical rear wall 33, and a forward wall 35. Each of the side walls 31 is defined by a generally vertical rearward edge, and by a forward edge which is inclined inwardly from each of its upper and lower ends so as to converge upon a point generally midway of the height of the cabinet. The forward wall, in the illustrated embodiment, is comprised of an upper portion 35a which slopes rearwardly and downwardly from the upper forward edge of the cabinet, extending approximately to a line even with the lower wall of the chamber 15, and a lower portion 35b, inset from the inwardly inclined forward edge of the side wall and extending upwardly from the base of the cabinet so that its upper edge is in spaced relation to the lower wall of the chamber 15.

The upper portion of the cabinet is provided with a lid 37 comprising a forward and a rearward panel 39 and 41 respectively, interconnected by a common hinge 43, the axis of which extends normal to the side walls 31 of the cabinet. A second hinge 45 further connects the rearward edge of the rear panel 41 to the upper rearward edge of the cabinet. Each of the forward and rearward panels 39 and 41 of the lid includes a frame 47 of metal or the like and a transparent plate 49 which permits visual access to the chamber 15, soon to be described. Handles 51 are provided on the forward panel 39 to permit the lid to be easily raised and, as noted by the phantom lines in the drawing, when a force is exerted upwardly on the forward panel 39 by means of the handles 51, both the forward and rearward panels are raised as a unit. The upper edges of the cabinet are provided with suitable ledges 53 to receive the lid in the closed position.

The refrigerated chamber 15 is in the form of a recessed well and extends inwardly of the cabinet 11 from the upper edges of the side, rear and front walls thereof. The chamber is defined by the inner wall structure 13 which includes a pair of inwardly sloping side walls 55, and downwardly sloping converging front and rear walls 57 and 59 respectively connected at their lower ends by a downwardly and forwardly sloping bottom wall 61. The microtome 17 is fastened to the front wall 57 by suitable bolts or the like (not shown). All of the walls of the chamber are spaced from their adjacent cabinet walls to provide room for the refrigeration coils 19 and suitable insulation 63. A spacer sheet 65 may be interposed between the coils and insulation if desired.

A hollow bar 67 extends horizontally across the chamber and serves to support the receiving means or dish 23 within which the chemical of sterilization is supported. It should be apparent, of course, that the dish might be supported elsewhere within the chamber if desired. In the illustrated embodiment, the bar 67 also serves as a conduit for the refrigerant, thereby providing a cold surface within the chamber to facilitate the freezing of the specimen.

When the chamber 15 is refrigerated, moisture tends to accumulate within the chamber in the form of frozen condensation or frost. When the walls 13 of the chamber are heated so as to raise the temperature within the chamber to the vaporization temperature of the chemical, the frost melts and, due to the sloping disposition of the walls of the chamber, flows down the walls to the lowermost portion of the bottom wall 61. An opening 69 is provided in the bottom wall and is connected to a suitable discharge pipe 71 which extends vertically downwardly from the opening, and a moisture receiving means in the form of a plastic bag 73 is secured to the lower end of the pipe 71 to collect the moisture. While it is of course possible to collect this moisture in an open receptacle such as a cup or beaker, the use of the bag 73 is preferable in that it also serves to seal the chamber at the lower end so as to prevent the flow of air downwardly through the pipe while the chamber is being exhausted, as will hereinafter become apparent.

To permit access to the drain pipe 71 and receiving bag 73 of the chamber, as, for example, when it is desired to remove accumulated moisture, a compartment 75 is provided within the cabinet 11 immediately beneath the chamber 15 and is defined by a horizontal lower wall 77 which extends inwardly from the upper edge of the lower portion 35b of the front wall, by a generally vertical back wall 79, and by a horizontal upper wall 81 which lies immediately beneath the chamber 15. A door 83 is provided in the forward portion of the compartment 75 to permit access thereto when desired.

The refrigeration of the chamber is accomplished by the refrigeration coils 19, and by the refrigeration means 21 which causes a refrigerant to flow through the coils and, in the illustrated embodiment, through the horizontal hollow bar 67 which supports the chemical supporting dish 23. One set of coils 19 is disposed adjacent each wall of the chamber, a total of five sets of coils being thereby provided with each set having a number of turns or loops.

The refrigeration means 21 which circulates the refrigerant through the coils and through the horizontal bar includes generally a compressor 85, a condenser 87, and a heat exchanger 89, these components, together with the hollow bar 67 and the several sets of coils 19, all combining to form a closed circuit for the refrigerant.

More specifically, the compressor 85 is suitably supported within the cabinet 11 and is connected by means of a conduit to the condenser 87, also supported within the cabinet. A capillary tube 93 extends, in coiled form, from the condenser 87 through the heat exchanger 89 and directly to an inlet opening (not shown) of the horizontal hollow bar 67, which opening is of a greater diameter than the capillary tube 93 and permits a rapid expansion of the refrigerant. An outlet opening (not shown) is also provided in the horizontal bar and is connected to the first of the sets of coils 19, which coils are interconnected so as to permit the refrigerant to flow through them consecutively. The last of the coils is connected by a conduit (not shown) to the heat exchanger 89, which is in turn connected by a conduit 95 to the compressor.

Decontamination of the refrigerated chamber is accomplished, in accordance with the preferred method, by means of a chemical vapor, certain epoxides such as propylene oxide having been found most preferable. Accordingly, means are provided in the apparatus for vaporizing the chemical within the refrigerated chamber so as to permit it to diffuse throughout the chamber and effect sterilization thereof.

More specifically, the means 25 in the illustrated embodiment includes electrical resistance heating elements disposed adjacent to, but insulated from, the walls of the chamber and electrically connected in parallel with one another. The heating units are capable of raising the temperature of the walls and the temperature within the chamber to above the vaporization temperature of the chemical utilized. For example, when propylene oxide which boils at 34.1° C. is used, it has been found desirable to raise the temperature of the walls to around 50° centigrade (122° F.). The operation of the heating units is controlled by means of a switch 99.

The decontamination and sterilization is accomplished by deactivating the refrigeration means 21, placing the chemical receiving dish 23 with the chemical therein on the upper surface of the horizontal bar 67, and actuating the heating means. Of course, as previously mentioned, the chamber may be brought up to temperature before the chemical is placed therein.

During the initial portion of the decontamination of the chamber, while the walls 13 of the chamber are first being heated, frozen moisture which has condensed on the microtome 17, the walls of the chamber 13, and the horizontal hollow bar 67, will melt and drain toward the opening 69 in the lower wall 61 of the chamber. By the time the vaporization temperature of the chemical has been reached, therefore, very little if any of the frost of moisture remains within the chamber.

As the temperature within the chamber rises to the vaporization temperature of the chemical, the chemical is vaporized and diffused throughout the chamber, thus destroying any microorganisms that might be present therein. It is desirable that the lid be in the fully closed position while the decontamination is taking place so that all of the vapor will remain within the chamber. It is preferable to leave the vapor within the chamber for as long a time as is practical, preferably overnight, to insure that the sterilization has been complete.

After the sterilization has been accomplished, the chemical vapor is exhausted from the chamber 15 by means of the air blower 29 connected by means of a suitable conduit 103 to the drain pipe 71 of the chamber. In this manner, air is blown upwardly from the bottom of the chamber and outwardly through the mouth thereof. A switch means 109 controls the operation of the blower 29.

As previously mentioned, as the air from the blower 29 passes through the drain pipe 71 and upwardly through the chamber, the presence of the moisture receiving bag 73 is effective to prevent the air from flowing downwardly through the pipe and into the compartment beneath the chamber. Of course, if a beaker or dish were used to receive the moisture instead of the bag, the pipe 71 could be plugged in any suitable manner during the exhaust portion of the operation.

It is preferable that, during the exhaust operation, the air and vapor be caused to flow out of the chamber gradually and to sweep over the walls and the microtome so that any vapor or moisture which may have adhered to the walls or microtome will be carried out in the exhaust. This flow or sweeping of air over the walls may be accomplished by allowing the lid of the cabinet to be opened only slightly to provide a narrow vent along its forward edge, as by inserting a thin wedge adjacent the forward edge of the lid. With a narrow opening thus being provided, as shown in phantom in the drawing, the air flows gradually out of the chamber and passes over the walls as it flows.

An apparatus has thus been provided by means of which the sectioning of specimens can be accomplished in a refrigerated atmosphere. The apparatus is also provided with means which make it particularly adapted for decontamination by a chemical vapor. This feature of the apparatus is utilized in the sectioning of tissue specimens which, when diseased and occupied by infectious microorganisms, serve to contaminate the entire apparatus.

While various features of the invention have been shown and described it should be apparent that various modifications may be made therein without departing from the scope of the invention.

What is claimed is:

1. Sterilizable apparatus for the sectioning of frozen specimens, which apparatus comprises wall means defining a chamber, a microtome supported within said chamber, selectively operable means adjacent said wall means for cooling the same, means for receiving a quantity of a sterilizing chemical that is in a non-vaporous physical state, said chemical when in a vaporous state being adapted to destroy microorganisms present in said chamber upon contact therewith, and selectively operable means adjacent said wall means for heating the same so as to raise the temperature of the chamber to above the temperature of vaporization of the chemical.

2. Sterilizable apparatus for the sectioning of frozen specimens, which apparatus comprises wall means defining a chamber, a microtome supported within said chamber, selectively operable means adjacent said wall means for cooling the same, means for receiving a quantity of a sterilizing chemical that is in a non-vaporous physical state, said chemical when in a vaporous state being adapted to destroy microorganisms present in said chamber upon contact therewith, and selectively operable means adjacent said wall means for heating the same so as to raise the temperature of the chamber to above the temperature of vaporization of the chemical, and means for causing a flow of air through said chamber so as to exhaust said chemical vapor therefrom.

References Cited by the Examiner
UNITED STATES PATENTS

| | | | |
|---|---|---|---|
| 1,397,504 | 11/1921 | Diner | 21—58 |
| 2,240,001 | 4/1941 | Harvey | 21—85 |
| 2,504,794 | 4/1950 | Berman et al. | 165—64 |
| 2,773,354 | 12/1956 | Tillman | 62—276 |
| 2,993,832 | 7/1961 | Kaitz | 21—58 |
| 3,102,777 | 9/1963 | Bedrosian et al. | 21—58 |

MORRIS O. WOLK, *Primary Examiner.*

DONALL H. SYLVESTER, *Examiner.*